United States Patent [19]

Waring

[11] Patent Number: 4,623,888
[45] Date of Patent: Nov. 18, 1986

[54] MULTI-FUNCTION CONTROL INTERFACE CIRCUIT

[75] Inventor: David L. Waring, Convent Station, N.J.

[73] Assignee: AT&T Bell Laboratories, Murray Hill, N.J.

[21] Appl. No.: 559,354

[22] Filed: Dec. 8, 1983

[51] Int. Cl.⁴ .................. H04Q 11/00; H04J 3/00
[52] U.S. Cl. ......................... 340/826; 370/67; 379/272; 379/284; 340/825.68
[58] Field of Search ............ 340/825.68, 825.03; 179/18 EB, 18 ES; 370/66, 67, 85, 17, 62, 13, 95, 104; 375/11, 12

[56] References Cited

U.S. PATENT DOCUMENTS

| | | | |
|---|---|---|---|
| 3,812,297 | 5/1974 | Borbas ........................... | 179/18 ES |
| 4,027,108 | 5/1977 | Moorehead et al. ........... | 179/18 EB |
| 4,057,847 | 11/1977 | Lowell et al. .................... | 364/200 |
| 4,293,909 | 10/1981 | Catiller et al. ................... | 364/200 |
| 4,315,330 | 2/1982 | Brickman et al. ............... | 370/104 |
| 4,320,505 | 3/1982 | Baun, Jr. et al. ................ | 370/110 |
| 4,373,183 | 2/1983 | Means et al. .................... | 364/200 |
| 4,380,065 | 4/1983 | Hirtle et al. ..................... | 370/85 |
| 4,442,502 | 4/1984 | Friend et al. ..................... | 370/67 |
| 4,495,618 | 1/1985 | Dupuis et al. .................... | 370/66 |

OTHER PUBLICATIONS

"Peripheral Devices for the Unimat 4080 PABX", *Electrical Communication*, vol. 55, No. 1, 1980, H. D. Siebel, pp. 57-62.

"Structure of the Hardware in the Telephone System EMS", *Telcom Report* 2, Hartmut Frost et al., 1979, pp. 14-21.

*Primary Examiner*—Donald J. Yusko
*Attorney, Agent, or Firm*—Charles Scott Phelan

[57] ABSTRACT

An interface circuit includes programmable registers both for making provisioning signals available to a set of electric circuit devices, and for monitoring operation of at least a portion of those devices. Signals received from a control source are employed to program the registers and to provision device control memories enabled for that purpose by one or more of the registers.

17 Claims, 9 Drawing Figures

| | D10 | D9 | D8 | D7 | D6 | D5 | D4 | D3 | D2 | D1 | D0 | DP |
|---|---|---|---|---|---|---|---|---|---|---|---|---|
| | | | | | | | | E4 | E3 | E2 | E1 | |
| 0 = STATUS | 0 | 0 | 0 | 0 | 0 | CK | UC | | | | | 0 |
| | | | | | | | | ↳ TO SWITCH ↲ | | | | |
| 1 = SENSOR | | | | | | | ✽ | Q9 | 0 | 0 | 0 | 0 |
| | ↳ TO SWITCH ↲ | | | | | | | | | | | |
| 2 = LOOP | | 0 | 1 | 0 | 1 | 0 | 1 | 0 | 1 | 0 | P |
| 3 = INTERNAL | 0 | 1 | 0 | TST | WP | DCK | DUC | E4 | E3 | E2 | E1 | P |
| 4 = PROVISION | 0 | 1 | 0 | 1 | 0 | 1 | 0 | 1 | | | | P |
| | | | | | | | | | ↳ TO SWITCH ↲ | | | |
| 5 = PERSVC | | | | | | | | | 0 | 1 | 0 | P |
| | ↳ TO SWITCH ↲ | | | | | | | | | | | |
| 6 = MAINTAIN | | | | | | | | | | | | P |
| | ↳ TO SWITCH ↲ | | | | | | | | | | | |
| 7 = IOPROG | | | | | | | | | | | | P |
| 8 = OSELA | | | | | | | | | | | | P |
| 9 = OSELB | | | | | | | | | | | | P |

MULTI-FUNCTION CONTROL INTERFACE CIRCUIT

BACKGROUND OF THE INVENTION

This invention relates to an interface circuit; and it relates, in particular, to one such circuit which is useful for interfacing a control signal bus with a variety of different types of controlled circuits.

In large communication systems, a central office includes plural types of message signal transmission circuits, each requiring different types of signal treatment, e.g., echo cancellation, equalization, and gain adjustment. There is also a constant need for cost savings, and they are often realized by automating different functions. In that connection, it is known that functions of various signal treatment circuits can be set, sometimes called provisioning, by electrical remote control means.

In a system for remotely controlling the provisioning of communication channel treatment units, the control and monitoring signal communication of a central processing unit (CPU) via a bus with various subscriber commuinication channel units (CU) must provide different types and amounts of control signals, some of which may be required at different times. A time-shared bus is often used for such signal communication between a CPU and the CU's, and different types of interface circuits are employed for different CU types. A corresponding inventory of different CU integrated circuit interface chip types is required. A universal interface can be achieved with, e.g., a microprocessor-controlled circuit approach; but that has excessive function power for a substantial range of applications, and so represents a pre-unit cost penalty for those applications. In addition, a microprocess-controlled circuit typically exhibits lower speed and higher power consumption than a custom interface circuit.

Some examples of prior interface arrangements are noted. A Lowell et al. U.S. Pat. No. 4,057,847 shows a test interface unit for computing systems, and which includes a keyboard to control the entry of signals received via a telephone line used as a data link from a remote data processing unit. In a Catiller et al. U.S. Pat. No. 4,293,909, a host computer is coupled to plural base modules, each of which has plural peripheral controllers. Each of the latter controllers includes an application-specific logic module, and each logic module includes a universal standardized microprocessor for controlling and handling data transfer functions between the host computer and the peripheral device. A Means et al. U.S. Pat. No. 4,373,183 shows a distributed control system in which bus interface units (BIU) control allocation of access by system elements to a common central bus. The BIU includes a central processing unit, a DMA arrangement, memory, etc. A Baun et al. U.S. Pat. No. 4,320,505 includes channel units which have gating and flip-flop logic provided to reduce information flow between a channel unit and a controller by preventing the transmission, for example, of single-bit errors and current status.

SUMMARY OF THE INVENTION

In accordance with the present invention, a provisioning signal bus is interfaced with the devices in a channel unit (CU) that is to be provisioned by employing conditioning logic, programmable from the bus, to provide appropriate signals at interface circuit terminals to which CU devices to be controlled are coupled.

BRIEF DESCRIPTION OF THE DRAWING

A more complete understanding of the invention can be obtained from a consideration of the following Detailed Description and the appended claims in connection with the attached drawings in which

DETAILED DESCRIPTION

Figure 1:
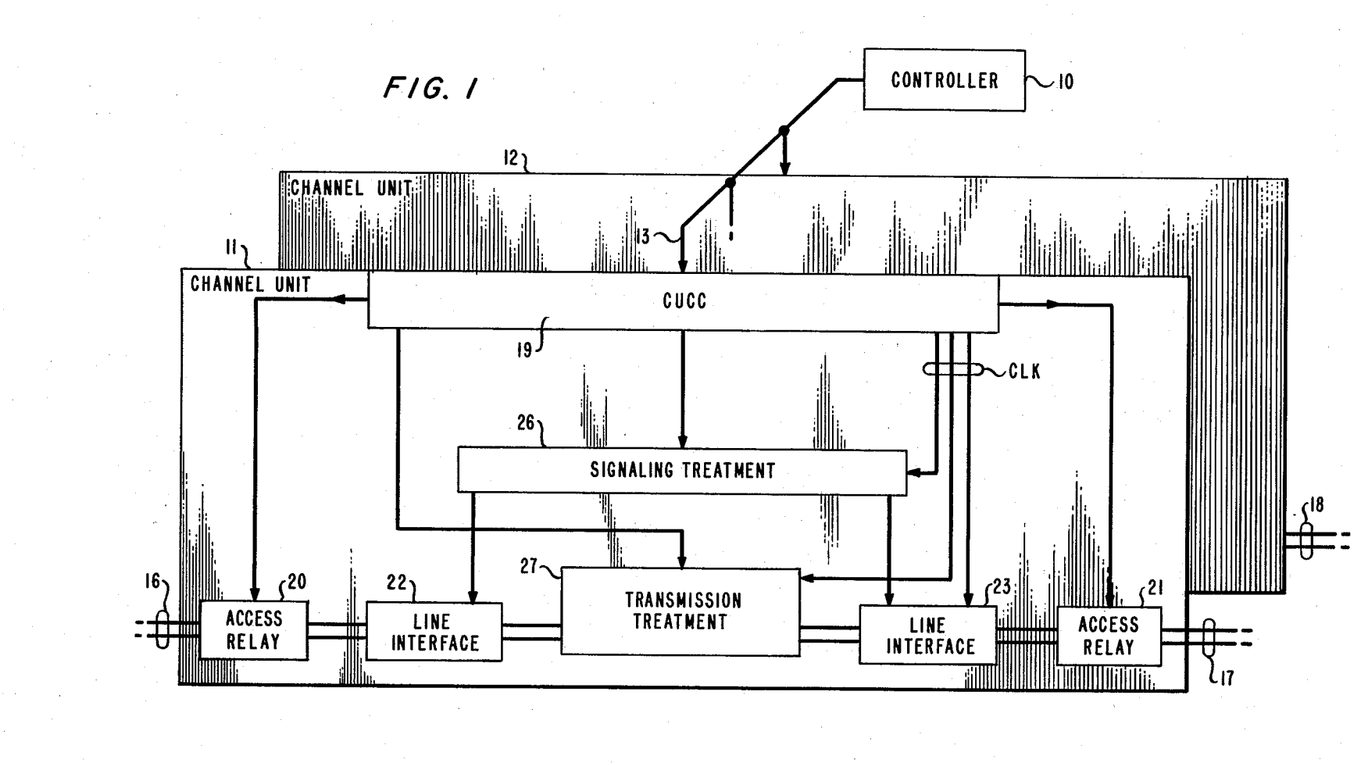
FIG. 1 is a block and line diagram of a communication system portion including plural channel units, each including an interface control circuit in accordance with the invention.

In FIG. 1, a controller 10 is coupled to plural CU's, such as the units 11 and 12 which are specifically illustrated, of a communication system by way of a multiconductor bus 13. Message communication paths of the system extend through respective CU's between, e.g., a telephone central office (not shown) and various subscriber premises (not shown). Only several of such paths appear in the drawing and include two wire paths 16 and 17 on opposite electrical sides of CU 11, and a similar path 18 on one side of the CU 12.

Controller 10 includes at least one central processing unit (CPU) and communicates with the CU's by way of bus 13 for remotely setting switches or relays, for providing data, and for monitoring CU operation. Only CU 11 is shown in detail in the drawing to illustrate one application of the invention. In each CU, a CU control, or interface circuit, such as the circuit 19 in CU 11, provides interface functions between bus 13 and the devices of its particular CU. In the illustrative CU 11, access relays 20 and 21 respond to set and release signal states from interface circuit 19 for connecting and disconnecting, respectively, the signal transmission paths 16 and 17, respectively, to the CU 11. Line interface circuits 22 and 23 similarly respond to signals from circuit 19 to control switches in either of them for, e.g., accomplishing loop-start/ground-start signaling selection. Circuit 26 is a signaling treatment circuit which advantageously includes a microcomputer arranged for reshaping dial pulses before an equalized path has been set up between calling and called subscribers; so it must receive from circuit 19 both control signals to enable provisioning paths and clock signals for synchronizing its operation. The signaling treatment circuit is connected to the line interface circuits 22 and 23 which contain detectors and generators for converting transmission paths 16 and 17 signaling states such as open loop, loop current, dial pulses and ringing into digital signals. These digital signals can then be interpreted and processed by the signaling treatment circuit and relayed from one side of the CU to the other. Finally, a transmission treatment circuit 27 is included in the transmission path between paths 16 and 17 for performing, e.g., echo cancellation and signal equalization functions as shown, for example, in the paper "A Fully Adaptive Transversal Canceler and Equalizer Chip" by E. J. Swanson et al., and appearing in 1983 *IEEE INTERNATIONAL SOLID-STATE CIRCUITS CONFERENCE, DIGEST OF TECHNICAL PAPERS* at pages 20, 21, and 279. Such a transmission treatment circuit requires both clock and control signals from circuit 19 throughout its service and digital coefficient signals from bus 13 by way of circuit 19 for initially provisioning the treatment circuit coefficient memories.

The manner of interfacing by circuit 19 is electrically provisionable from bus 13, as will be herein described, by use of an array of conditioning signal registers. "Provisionable" is here used with reference to the ability to have loaded into circuit 19 signal representations which fix conditions at certain circuit 19 output terminals and fix the manner of operation of some parts of the circuit 19. FIGS. 2–6 herein relate to an illustrative arrangement and operation of circuit 19 to enable it to interface with different types of devices in different types of CU's.

Figure 2:
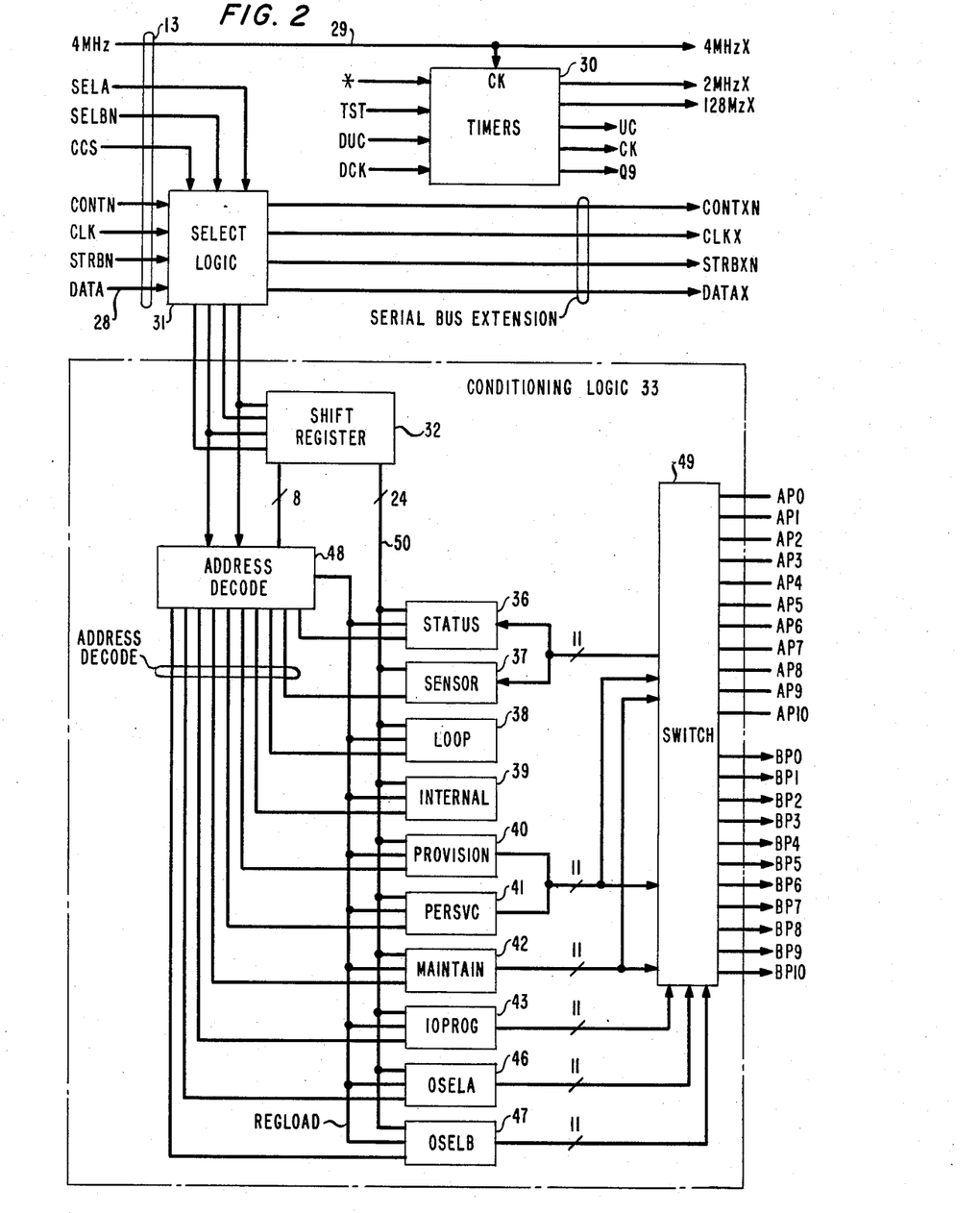
FIG. 2 is a block and line diagram of such an interface control circuit.

In the FIG. 2 block diagram of the interface control circuit, the various leads of the bus 13 are collectively called a serial bus because they include a data circuit for coupling bit-series data signals between the controller 10 and the interface circuit 19. The leads of bus 13 are shown at the left of FIG. 2, and also include leads for a variety of other purposes. One of these is a first clock lead 29 providing a clock signal, such as the illustrated nominal 4-MHz signal supplied by the controller 10 for timing CU operations. Lead 29 extends through the circuit 19 to the devices of the CU 11, and it is also available to a timing circuit 30 and to other CU's of the system.

Three leads are included in bus 13 to select the circuit 19 and determine its mode of operation in terms of the routing of signals; and these include leads SELA, SELBN, and CCS. SELA and SELBN provide signals to define the unique address of the circuit 19 among all the CU's, and corresponding sets of leads (not shown) are available in bus 13 for other CU's. In the case of the circuit 19, the unique address is a binary ONE SELA signal, and a binary ZERO SELBN signal that must be present or the serial bus signals will be totally ignored. Since each circuit 19 uses a different combination of two leads, all with the same signal selecting pattern, from CU address leads in bus 13, the number of required CU address leads is halved. A CCS lead is also provided for controlling select logic 31 to allow the bus 13 to communicate either with internal conditioning logic 33, to be described, of circuit 19 or with other devices of the CU 1 by way of a signal bus extension.

Four leads CONTN, DATA, CLK, and STRBN are provided in bus 13 for communication with either the circuit 19 conditioning logic 33 or the devices of CU 11 in the one of the CU's selected for communication, as previously noted. The CLK lead signal is a message clock. In a telephone system application, communication over bus 13 is required in at least three ways. There is the initial provisioning of a communication path, including paths 16 and 17 and the CU 11, when the CU is first put into service for, e.g., a special service application such as a PBX trunk. Periodic, e.g., daily, monitoring of the status of CU operation to locate troubles is also needed. The term "provisioning" is here used in essentially the same way previously described in regard to circuit 19, and the provisioning is carried out with the aid of the control logic 33, as will be described. A clear lead CLRN is provided in bus 13 for clearing circuits of conditioning logic 33 in all CUs prior to provisioning CU 11 devices.

At the device side of the interface circuit 19, there are several lead sets. Plural controller-related clocks comprise one set and include, illustratively, the previously mentioned 4-MHz clock and two lower frequency derived clocks at the nominal frequencies of 2 MHz and 128 kHz. A serial bus extension through circuit 19 ends at a set of signal relay input/output leads CONTXN, DATAX, CLKX, and STRBXN where there may appear either the same (relayed) signals as are on the similarly designated leads of the serial bus at the left-hand side of FIG. 2 or a predetermined set of signal states, depending on the mode of operation of the circuit 19 as determined by the lead CCS. CONTXN signals determine whether data signals on the DATAX circuit will flow to or from the circuit 19 devices. CLKX signals provide the data bit rate clock for such data signals, and the STRBXN signals mark the time limits of a time interval including a burst of data signals. Additional device input/output connections for circuit 19 include a set designated AP0–AP10 for signals either to or from the CU devices, and a set designated BP0–BP10 for only signals being extended out from circuit 19.

Individual circuit blocks of FIG. 2, i.e., circuit 19, are all of well-known types, and their types and interconnection arrangements will be hereinafter outlined.

The timers block 30 includes frequency dividing circuits and associated logic for providing equipment clock signals at different rates. Certain providing associated timing functions are also advantageously performed. Illustratively, the nominal 2-MHz clock 2 MHZX is supplied for operation of a microcomputer in the signaling treatment circuit 26; and a nominal 128-kHz clock is supplied for operation of a DC-to-DC converter in one of the line interface circuits 22 and 23. Such a converter usually is needed in only one of a pair of line interface circuits in a CU. A sanity timer is included for the microcomputer; it receives an input therefrom via the conditioning logic 33 on a lead designated *; and it provides an output time-out signal on a lead designated UC when the period of input * is greater than n times the driving clock rate. Cycle-measuring, clock timer, logic in timers 30 provides an output on a lead CK when the 4-MHz clock input to timers 30 from circuit 29 drops in frequency by some predetermined extent, such as 50%. Inputs DUC and DUK from logic 33 can be placed in certain binary states to inhibit the inputs to the sanity timer and the 4-MHz clock timer, respectively. Another output Q9 is compared, along with the UC output, during a test (TST input) to test for a count-down fault of the timers block 30.

Select logic 31 includes hard-wired logic responsive to a binary ONE SELA and a binary ZERO SELBN to enable operation of other circuits in logic 31. Those other circuits include a steering logic array to control the mode of circuit 19 operation, as previously outlined. A ZERO CCS signal enables a first three-level transceiver circuit (not shown) between the serial bus 13 and the serial bus extension, and it disables a second such transceiver (not shown) between the bus 13 and conditioning logic 33. Therefore, the CONTN, CLK, and STRBN signals are relayed from the bus 13 through the serial bus extension as CONTXN, CLKX, and STRBXN signals to the CU 11 devices; and data is relayed between bus 13 and those devices in a direction determined by the state of the CONTN signal state. A ONE CCS signal disables the first transceiver, causing it to output to the devices a CONTXN ONE, a DATAX high impedance, a CLKX ZERO, and a STRBXN ONE, regardless of the signals on bus 13; so no data is relayed in either direction with respect to the devices. At these times, however, the second transceiver is enabled; and bus 13 CONTN, DATA, CLK, and STRBN signals are coupled through logic 31 for communication with logic 33. When that second transceiver is disabled, its outputs are the same as those mentioned for the disabled first transceiver. Logic 33 is operated by controller 10 for performing the control and monitoring functions necessary for provisioning and maintaining the devices of CU 11.

In the logic 33, a shift register 32 performs serial-parallel conversions for coupling DATA signals between the bus 13 and a set of, illustratively, ten internal registers 36 through 43, 46, and 47. These registers are advantageously further designated STATUS, SENSOR, LOOP, INTERNAL, PROVISION, PERSVC, MAINTAIN, IOPROG, OSELA, and OSELB, respectively, to suggest to the reader their respective functions which will be described. An address decode circuit 48 supplies signals which determine which of the ten registers will be engaged in such DATA signal coupling at any time. It will become apparent that signals on DATA lead 28 are control or monitor signals in registers 36, etc. Registers 43, 46, and 47 are programmed to determine the state of a switch 49 which includes steering logic for coupling signals between various CU devices and selectable stages of other ones of the ten registers by way of the aforementioned input-/output leads AP_ and BP_. In order to preserve an understanding of the drawing, there are shown there only the principal signal flow paths; and the corresponding control and timing required for proper utilization of those paths will be herein described in outline, since its implementation is well known in the art, once those requirements are specified.

Figure 4:
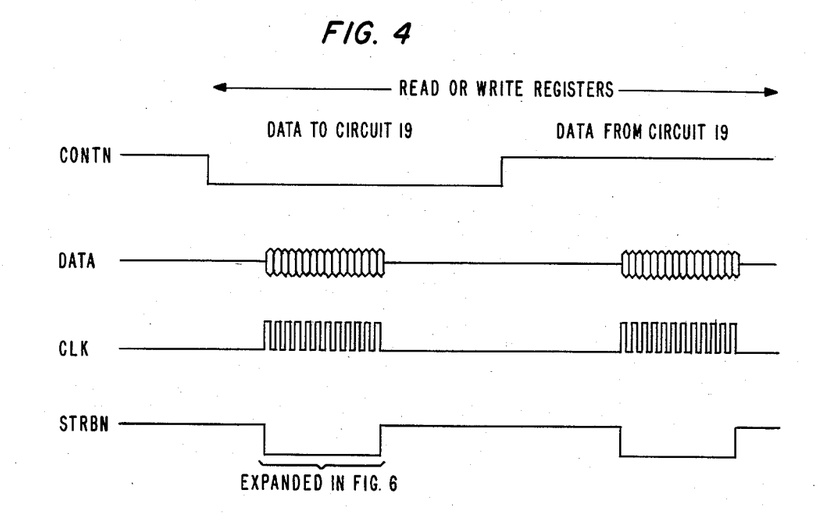
FIG. 4 is a family of timing diagrams illustrating a set of bus input/output signals for the interface circuit of FIG. 2.
Figure 5:
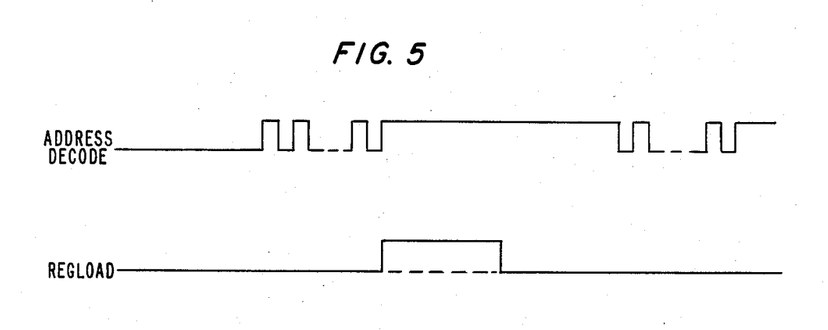
FIG. 5 is a set of related timing diagrams.
Figure 6:
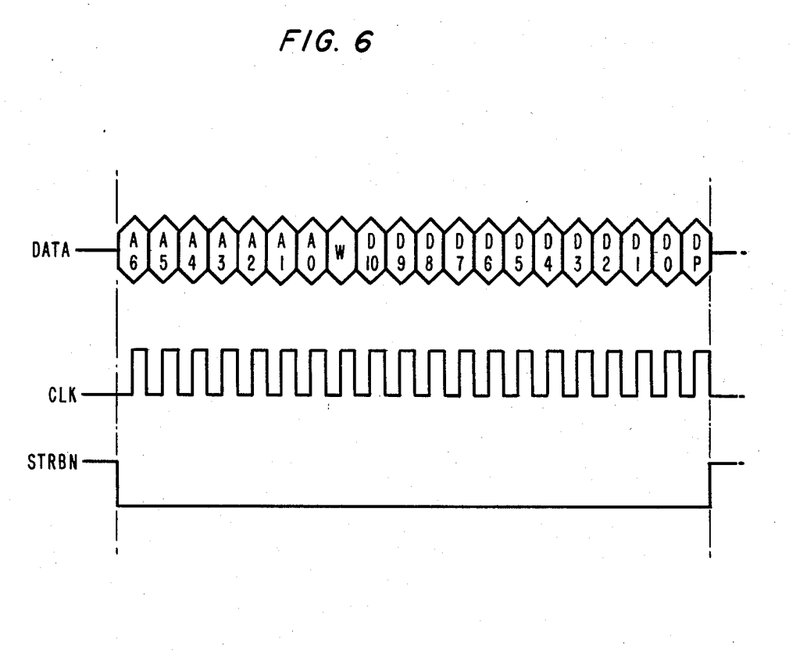
FIG. 6 is an expanded scale diagram of a data signal burst in FIG. 4.

In the conditioning logic 33, shift register 32 is illustratively a 20-bit register; and it is enabled by the STRBN signal and clocked by the CLK signal for operating in a direction fixed by the state of the CONTN signal either to load serial data from, or to supply serial data to, the bus 13 DATA lead 28. FIGS. 4 and 6 show the timing for the serial bus 13. Timing for either a read from a register of interface circuit 19 to, or write to such a register from, the bus 13 is basically the same. A read or a write normally consists of two sequences, a data-to-the-interface sequence and a data-from-the-interface sequence as shown in FIG. 4. A write to a register can be accomplished with only a data-to-the-interface sequence, but normally a data-from-the-interface sequence immediately follows to verify the accuracy of the operation. Each sequence includes a data burst of similar makeup, as shown on expanded scale in FIG. 6. The bit types in a burst illustratively include 12 data bits DP and D0–D10 which are used for purposes to be described, one write/read bit W to direct whether register 32 should read or write in bit-parallel with respect to one of the internal registers 36, etc., and seven address bits A0–A6 (only four of which are required for the ten-register illustrative embodiment) to indicate which of the internal registers will be read to or written from bus 13 (through register 32) in any particular communication operation.

The stages of shift register 32, and in many cases of internal registers 36, etc., are advantageously bistable circuit stages. The 12 right-most stages of register 32, i.e., those containing the 12 D_ bits of FIG. 6 after a data-to-the-interface burst, are coupled through a bidirectional bus 50 having a 12-circuit outgoing portion extending to inputs of corresponding stages, respectively, of most of the internal registers 36, etc. Bus 50 also includes a 12-circuit input portion extending from outputs of each of the registers 36, etc. to respective stage inputs of register 32. Output signals from register 32 are continuously available to the output portion of bus 50; but the register includes internal gating (not shown) which allows it to sample inputs from the input portion of bus 50 only when STRBN is negative-going while CONTN is high and a valid decoded address is provided from circuit 48, i.e., only just prior to a data-burst in a data-from-the-interface sequence.

Address decode circuit 48 in FIG. 2 includes logic circuits of known type for responding to the address field in register 32 for selecting one-out-of-n output leads where n is illustratively ten in FIG. 2. The decoded address output enables parallel inputs of a corresponding one of the internal registers 36, etc. to load signals applied in bit-parallel from shift register 32 data and parity bit locations. Such decoded address outputs are, as a group, designated ADDRESS DECODE in FIG. 2. Circuit 48 also advantageously includes logic jointly responsive to a low CONTN signal and a high STRBN signal, as in FIG. 4, and to a one W bit to produce a high REGLOAD signal, as in FIG. 5, for enabling any internal register, except a SENSOR register, if addressed, to be loaded from register 32. Otherwise, i.e., if W=0, REGLOAD remains low and no internal register loading is possible; and the addressed register contents are available to register 32 as usual, and sampled therein on a negative-going STRBN signal, as already described.

In the data-to-the-interface sequence, data is clocked into the register 32 of the interface in a CU selected by the SELA and SELBN signals, that clocking advantageously taking place on the rising edges of the clock pulses of FIG. 6. Similarly, in the data-from-the-interface sequence, data is clocked from that register to the bus 13 on the falling edges of the clock CLK. Between those two sequences, data may be transferred from the register 32 to a selected one of the internal registers 36, etc., dependent upon the state of the W bit. The internal register selection is achieved by signals from the address decode circuit 48 to be described.

When reading information out of an internal register to bus 13, the desired register address, a W bit ZERO, and all-ZERO data and parity bits are first written into shift register 32 from bus 13 in a data-to-the-interface sequence. An eight-bit bus couples that W bit and the seven address bits to circuit 48 where the W bit is used to inhibit the REGLOAD enabling of all the register inputs by circuit 48. Then, during the interval just before the data burst of the data-from-the-interface sequence begins, the occurrence of the negative-going STRBN during the hig CONTN signal allows the addressed register output to be overwritten into the data and parity bit positions in shift register 32. When the internal register data and parity bits are clocked from register 32 to bus 13, the address and W bits in register 32 go too and can be checked in controller 10 against what had earlier been sent out to make sure that there had been no error in address and W bit transmission to interface circuit 19 and back.

When writing information into an internal register from bus 13, the desired register address, a W bit ONE, and the desired data and parity bits are clocked from bus 13 into register 32 during a data-to-the-interface sequence. An ADDRESS DECODE signal is produced, as before, to select one register. Now, however, the binary ONE W bit is used in conjunction with the low CONTN signal and the negative-going STRBN signal to set a REGLOAD output signal that enables inputs of all of the bistable stages of the addressed internal register. Then, during the interval just after the data-burst of the data-to-the-interface sequence ends, the data and parity bits are written into the addressed internal register. The resulting content of that register is then sampled, i.e., overwritten, back into register 32 on the negative-going STRBN signal just before the data-burst of data-from-the-interface sequence. Thus, after the data-from-the-interface sequence has transferred the addressed register contents out, all bits originally sent out from controller 10 can be checked by the controller for transmission errors.

The parity bit is intended to be used as an integrity check on data after it is stored in the logic 33 and when there is insufficient process time available to make a bit-by-bit comparison. The controller 10 periodically reads the data, and parity is recomputed to determine whether or not any bits have been corrupted.

It is apparent then that controller 10 is able, by appropriately assembling control and data messages, to write any pattern of bits into any one of internal registers 36, etc., except register 37, at a time, and to read the pattern of bits residing in any one of the internal registers. Once so loaded, the register contents, in most cases, remain the same until later overwritten or cleared by the CLRN signal; so by writing, i.e., programming, those registers one at a time, controller 10 establishes a pattern of interface functions in interface circuit 19. That pattern can, of course, likewise be changed at any time by controller 10 operation. For the illustrative application indicated in FIG. 1, there are advantageously in FIG. 2 three types of functions: the control of switch 49 exercised through registers IOPROG, OSELA, and OSELB; the distribution of control signals to CU devices, and the collection of device state monitoring signals by registers STATUS and SENSOR; and local control and diagnostics exercised through registers LOOP and INTERNAL. Implementation of those functions is achieved either by operation of switch 49 to interconnect a selected stage of a selected register with a selected one of the input/output connections AP— or BP—, or by a manner of interconnecting register stages with each other and/or other elements of conditioning logic 33 and timers 30. An illustrative set of internal register stage interconnections will be discussed in connection with FIG. 3.

First, however, switch 49 has five sets of 11-bit connections for five of the internal registers which distribute and collect signals. They include a set from switch 49 for input connections to the STATUS and SENSOR registers, a set to switch 49 for output connections (through the switch to AP—) from each of the PROVISION/PERSVC regiseter combination and the MAINTAIN register, and a set to switch 49 for output connections (through the switch to BP—) from each of the PROVISION/PERSVC register combination and the MAINTAIN register. Switch 49 steers those signals with respect to all or part of the two sets of connections AP— and BP—, each of which is also 11 bits wide. The connections AP— may be used for either input or output, but the connections BP— are for output only. The selection paths through switch 49 for active use is controlled by signals from three sets of 11-bit inputs from the three aforementioned switch control registers IOPROG, OSELA, and OSELB, respectively.

In the internal registers 36, etc., each stage is advantageously considered to be numbered to correspond to the data bit numbers shown in FIG. 6. A stage which is connected to switch 49 is, illustratively, permitted to be connected through the switch to only a similarly designated one of the connections in set AP— or set BP— or to control only a similarly designated one of the connections of such set. Accordingly, switch 49 contains an array of gates for discretely accomplishing each of the permitted connections; and the gated path employed to activate the use of any particular connection of either set of the connections AP— or BP— is enabled by a corresponding output of at least one of the control registers IOPROG, OSELA, and OSELB.

Figure 7:
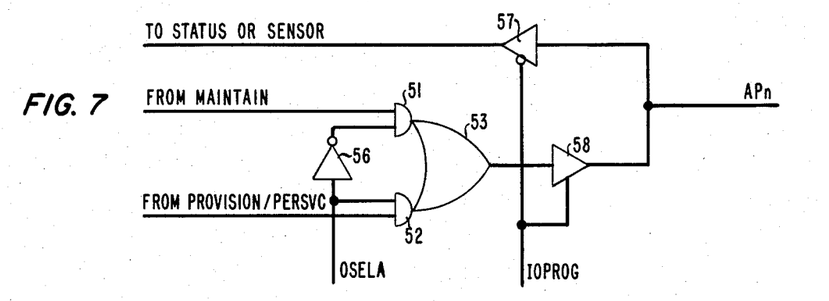
FIGS. 7, 8, and 9 are schematic diagrams of unit portions of circuits of FIG. 2.

It is convenient to describe here typical gated terminal paths through switch 49. Such an arrangement for an arbitrary input/output connection APn is shown in FIG. 7. An AND/OR gate combination, including AND gates 51 and 52 supplying inputs to an OR gate 53, is responsive to an OSELA signal state for determining whether a stage of the PROVISION/PERSVC register combination or a stage of the MAINTAIN register will be the one coupled through the gate combination. OSELA is applied directly to gate 52 and applied through an inverter 56 to gate 51. A signal from a stage of the IOPROG register is applied directly to a buffer 57, and through an inverting connection to a buffer 58, to determine whether signals at the output of gate 53 will be coupled to connection APn or signals at connection APn will be coupled in the opposite direction to a stage of the STATUS/SENSOR register combination. For an arbitrary output-only connection BP—, only the PROVISION/PERSVC register combination and the MAINTAIN register are involved; and their respective outputs are selected by another AND/OR gate combination (not shown) in response to an OSELB signal, no IOPROG control being required.

Figure 3:
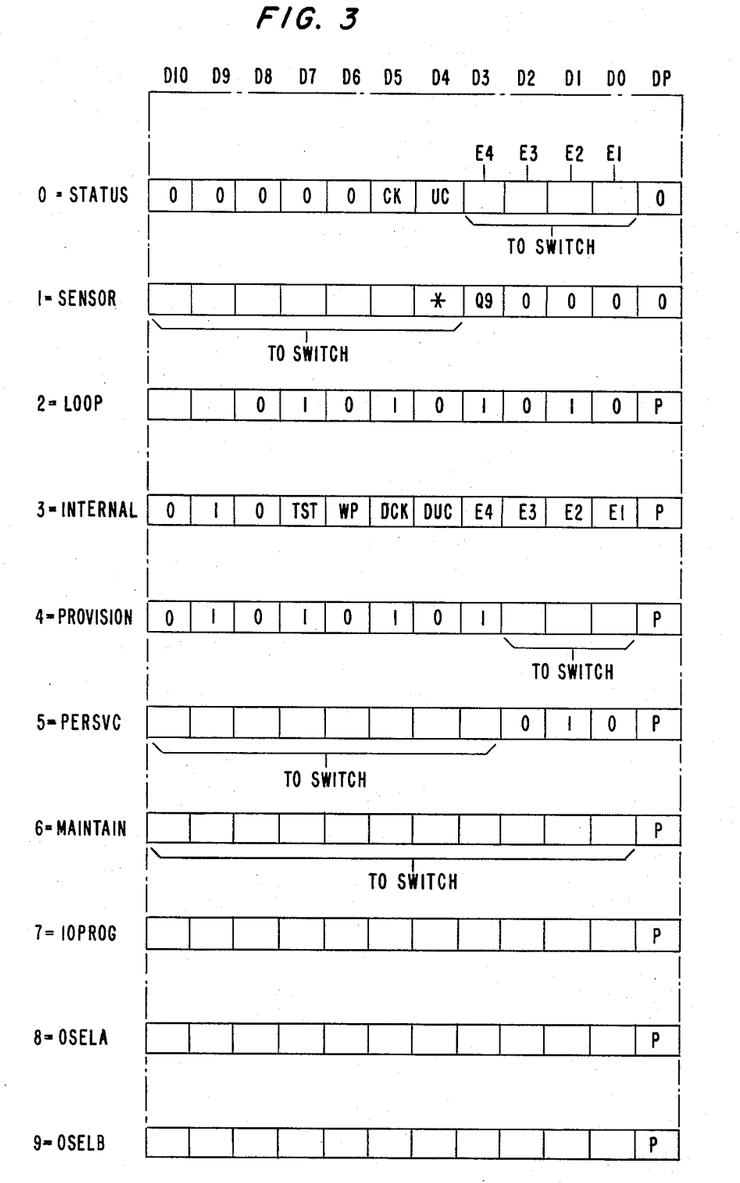
FIG. 3 is a diagram of stages of programmable registers of FIG. 2 showing individual register stage functions.

FIG. 3 is a map of a memory including all of the internal registers 36–43, 46, and 47 for the illustrative interface circuit 19 in CU 11. However, that is not a typical memory because, for example, some stages, or bit locations, of different registers are operatively interconnected, as will be hereinafter described. Also, some stages advantageously have different circuit configurations, as will be described. Bit location addresses for all of the registers are shown across the top of the memory map and include the 12 bits DP for the right-most, i.e., parity, bit position and D0 through D10 for data. Register addresses, illustratively 0 through 9, are shown along the left-hand side of the memory map, along with the corresponding register names employed in FIG. 2. In addition to the bit-parallel read/write coupling with the shift register 32, and individual stage input/output coupling with switch 49, certain stages have permanent connections among register stages, and are schematically represented by reference characters in the stage representations in FIG. 3. With the exceptions noted below, controller 10 can write any stage of any of the registers by reading the required register contents, changing the desired one or more bits in those contents while in controller 10, and then writing the modified register content word back into the appropriate register, thereby overwriting the prior, pre-change, contents of that register in the process.

The STATUS register senses amplitude transitional edges of signal levels. The contents of shift register 32 can be used to write only ZEROs in the STATUS register when the latter register is enabled from circuit 48 during a data-to-the-interface sequence of a write from bus 13 to logic 33. Bits DP and D6 through D10 are not needed in the illustrative embodiment; so they include buffer amplitude stages having their inputs connected to a low, i.e., binary ZERO, bias so that their outputs are always ZERO. Thus, they cannot be written. Those stages are, nevertheless, included in the illustrative embodiment to assure a uniform word size among the registers for convenience of processing in controller 10. Bits D0 through D3 are dual flip-flop circuits, as shown in FIG. 8, and have a data input DATAIN connected through switch 49 to receive CU device monitoring signals from input/output connections AP0 through AP3.

Figure 8:
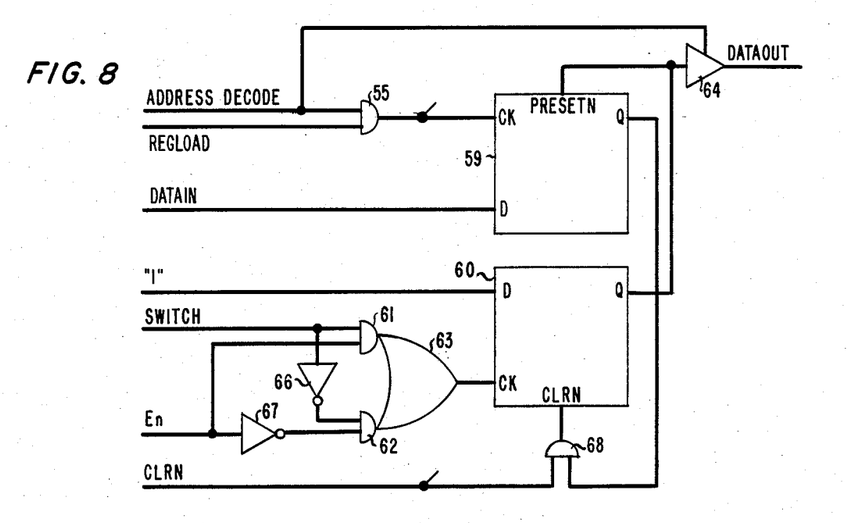

In the FIG. 8 dual flip-flop circuit, two d-type flip-flops 59 and 60 are interconnected, so that signals from shift register 32 via bus 50 can write only binary ZERO. This facilitates the design of controller 10 software for resetting a bit after a signal edge has been sensed. That is, since device signal states can change rapidly in many CU's, bit resets must be accomplished quickly. One way to do that is with a single-ZERO word written into a register that ignores ONE inputs. DATAIN from bus 50 is applied to a D input of flip-flop 59. That D input is sampled at a positive-going edge of the REGLOAD signal at the CK input when gate 55 is enabled by an ADDRESS DECODE signal.

At flip-flop 60, the D input is wired to a high (binary ONE) bias; and the CK input is provided through edge selection gates from a connection APn by way of switch 49. Those gates include an AND/OR combination of gates 61, 62, 63 to couple the switch 49 signal to gate 61, and, after inversion in a buffer 66, to gate 62. An En signal from a stage of INTERNAL register 39 is applied directly to enable AND gate 61 for selecting a positive-going edge if En is a ONE; and En is applied through an inverting buffer 67 to enable gate 62 for selecting a negative-going edge if En is a ZERO.

Flip-flops 60 and 59 rest in the clear (ZERO) and preset (ONE) states, respectively, while awaiting a signal edge of appropriate sense from switch 49. That edge clocks a ONE into 60, and its Q output is coupled through a tristate buffer 64 as a DATAOUT signal which is available to the shift register 32 input via bus 50. The same Q output applied to a PRESETN input of flip-flop 59 has no effect, because that circuit is already in the set state. All the while the high Q output of the set flip-flop 59 cooperates with the high CLRN signal (FIG. 2) to hold the output of an AND gate 68 high so flip-flop 60 cannot be cleared. Any attempt to apply a ONE at DATAIN has no effect because 59 is already set.

On the next read of the register, including the stage of FIG. 8, the ADDRESS DECODE signal enables gate 64; and controller 10 detects the high DATAOUT, takes appropriate action, changes the bit to ZERO, and writes the register word back, causing DATAIN in FIG. 8 to go low. Application of that low ZERO resets 59 when REGLOAD enables its D input. Now, the low Q output of 59 disables gate 68; and the resulting low signal clears 60, thereby making DATAOUT ZERO. The low Q signal from 60 at the PRESETN input of 59 sets 59, thereby restoring the whole stage circuit to its rest state. Any attempt to apply signal at DATAIN to change DATAOUT is now of no effect, because flip-flop 59 is already in the preset state; and, if temporarily cleared by a REGLOAD signal occurrence, its low Q output tries to initiate a clearing of 60, which is already cleared. So, the Q output of 60 and DATAOUT do not change; and 59 is immediately set again by the low output of 60.

Returning to FIG. 3, bit D4 (otherwise designated UC) of the STATUS register is also a FIG. 8 dual flip-flop circuit which is initially set to ZERO in the normal way from register 32. However, it has no switch input signal; and, instead, its flip-flop 60 is clocked from the timers 30 UC output when the microcomputer sanity timer times out. Bit D5 (CK) in the STATUS register is also a FIG. 8 dual flip-flop circuit that is initially set to ZERO from register 32. Its flip-flop 60 is clocked from the output of the 4-MHz clock timer in timers 30 to register clock failure.

The SENSOR register in FIG. 3 is used to sense, i.e., monitor, signal levels at CU devices. All stages are buffer amplifiers with no REGLOAD input and no DATAIN from shift register 32. They do have outputs coupled to bus 50, and the sensor register is addressable so it can be read from register 32. The stages representing bits DP and D0 through D2 are reserved so their inputs are wired to low ZERO bias to hold the stages permanently in the low output (clear) state. Bit D3 has its input (Q9) connected to receive signals from the output of the ninth stage of the 17-stage microcomputer timer in timers 30 so that it always tracks the condition of that stage of the timer. That information is used in a timer test to be mentioned. Bit D4 has its input (*) connected through switch 49 to receive signals from terminal AP4 so that this stage monitors a CU device signal, such as a clock, from any preselected location in a CU device. Illustratively, that same switch signal is the microcomputer clock in device circuit 26, and drives the microcomputer timer in timers 30. Bits D5 through D10 have their inputs coupled through switch 49 to receive signals from correspondingly numbered input/output connections AP5 through AP10. One use for this arrangement is to arrange the CU 11 so that those terminals are connected to predetermined voltage levels to provide a binary-coded representation of the CU serial number, which is then available to the controller 10 simply by reading the SENSOR register.

Figure 9:
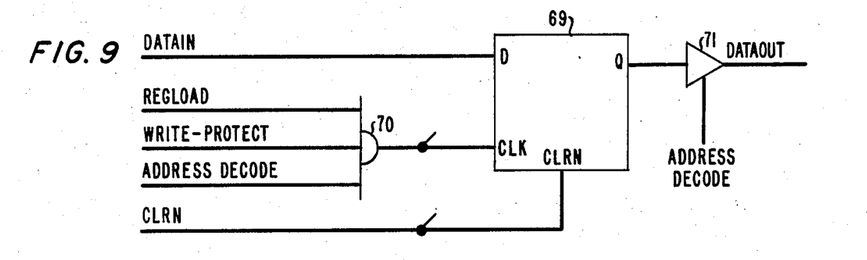

The LOOP register has no connections to the switch 49 or to other internal registers of logic 33; it is used by controller 10 for diagnosing the operation of serial bus 13 communication. Stages DP, D9, and D10 of the LOOP register, and stages of some other registers to be mentioned, are D flip-flop circuits arranged as illustrated in FIG. 9. There, the flip-flop circuit 69 responds to DATAIN signals at its D input when a positive-going enabling output is applied from an AND gate 70 to the CK input of all stages of the register. Gate 70 is so activated on coincidence of high REGLOAD and ADDRESS DECODE signals from circuit 48. A high write protect signal WP, to be described, is also required in some registers, but it is not used in the LOOP register. The CLRN signal is high in the absence of a clear signal; but when it goes low, it clears circuit 69 to the clear state. Q input of flip-flop circuit 69 is applied as DATAOUT to bus 50 by way of a tristate buffer gate 71 when that gate is enabled by the ADDRESS DECODE signal.

In the LOOP register, bit DP is set by the controller 10 in the usual manner in accordance with the states of other stages of the register to indicate proper parity for the contents then prevailing in the register. This same parity arrangement is also employed in the registers 39–43, 46, and 47. Bits D0 through D8 are buffer amplifiers, and have their inputs wired to hold them permanently in the illustrated ONE/ZERO pattern; and a similar arrangement is used for otherwise unused, or reserved, bits in the INTERNAL, PROVISION, and PERSVC registers. In the illustrative embodiment such use of buffers, in cases where a continuous output state is needed, saves integrated circuit device area as compared to, e.g., a permanently biased bistable circuit. Bits D9 and D10 have their D inputs and Q outputs coupled to shift register 32 through bus 50, and are used for reading and writing to supplement the diagnostic function of bits D0–D8 in checking the integrity of the bus 13.

INTERNAL register 39 uses register stage circuits of the type shown in FIG. 9 in bits DP and D0–D7 and buffer amplifier stages elsewhere. This register has no connections to switch 49. Its bits are used for various purposes, and they are read and written by controller 10 in the usual way for the respective stage types. Bits D0 through D3 (E1-E4) have their Q outputs, without ADDRESS DECODE gating, coupled to inputs of edge selection gates of correspondingly designated stages of the STATUS register to control the response of the latter to either positive-going or negative-going edges of signals from switch 49 as directed. Bit D4 (DUC) has its Q output, without ADDRESS DECODE gating, coupled to inhibit the input to the microcomputer timer in timers 30 when DUC is ONE to simulate a failure of, e.g., the microcomputer clock for diagnostic purposes. Bit D5 (DCK) has its Q output, without ADDRESS DECODE gating, coupled to inhibit the input to the clock timer in timers 30 when DCK is ONE for causing a similar simulated clock failure for diagnostic purposes. Bit D6 (WP) has its Q output, without ADDRESS DECODE gating, coupled to provide an additional input to gate 70 of service-affecting registers PERSVC, MAINTAIN, IOPROG, OSELA, and OSELB for thereby protecting them from a normal writing operation from register 32 without first changing the INTERNAL bit WP to ZERO. The term "service-affecting" means that erroneous information can render service useless to a subscriber. The PROVISION register is not write-protected because, in the illustrative embodiment, its bits are used to select a chip of transmission treatment circuit 27; and failure of that function would not affect service. Bit D7 (TST) has its Q output, without ADDRESS DECODE gating, coupled to timers 30 to control logic for selectably connecting the clock input to the microcomputer timer to the input of both the first and the tenth stages thereof so stages 1–9 and 10–17 can be operated simultaneously, with outputs Q9 and UC both examined simultaneously to check timer operation quickly.

The PROVISION, PERSVC, and MAINTAIN registers are at least partially read and written from register 32 in the normal manner after setting WP=0, as previously described. They have no interconnection with other internal registers, except for the write protection. Stages D0–D2 of PERSVC and D3–D10 of PROVISION are buffer-type stages with their inputs wired to produce the illustrated ONE-ZERO patterns, as described in connection with the LOOP register. Other stages of PERSVC, PROVISION, and MAINTAIN are of the type shown in FIG. 9; and those stages, other than DP, are the only ones in these registers available for active use in conditioning input/output connections AP— and BP—. The Q outputs of the stages which are available for conditioning are coupled through separate gated paths in switch 49 to the separate sets AP— and BP—, respectively, of input/output connections, as described in connection with FIG. 7. Bits D0 through D2 of the PROVISION register and bits D3 through D10 of the PERSVC register have their Q outputs so connected. The splitting of the total of 11 bits between two registers in this way allows a user to break up functions which are set up at any given time or changed at any given time. Thus, the PROVISION bits are advantageously used to select CU devices for provisioning communication via the external serial bus; and the transmission treatment circuit 27 canceler/equalizer tap weight memories are examples of circuits to be so selected. The PERSVC bits are advantageously used thereafter to set options in the CU devices. Examples of options include selecting loop start or ground start operation in the line interface units 22 and 23, respectively, and operating access relays 20 and 21 to connect the CU for operation in the transmission path between paths 16 and 17. The outputs of the stages D-0 through D10 of the MAINTAIN register are advantageously used to control maintenance, diagnostic, disabling, and power-down functions in CU devices. MAINTAIN register outputs are usually needed when the CU is not in service in the transmission path, and its outputs are coupled through a separate set of inputs on switch 49 from those used by the PROVISION and PERSVC registers. Control signals OSELA and OSELB determine which register stage output is to be applied to a corresponding one of connections AP— or BP— as described in connection with FIG. 7.

Registers IOPROG, OSELA, and OSELB have FIG. 9-type stage circuits; and they are read and written from register 32 in the normal way, except that they require that the INTERNAL register write protect bit WP=0. These three registers control switch 49 and have no interconnection to other registers, except for the WP bit connection. IOPROG bits separately select the direction of coupling through the input/output connections AP—, as already described. A ZERO selects a correspondingly designated AP— pin for input to internal registers, and a ONE selects it for output from the registers. OSELA bits determine, as to the AP— connections, whether any one of them will use a correspondingly designated bit of the PROVISION/PERSVC combination (if the bit is a ONE) or such a bit of the MAINTAIN register (if the bit is a ZERO). OSELB bits determine as to the BP— connections whether any one of them will use a correspondingly designated bit of the PROVISION/PERSVC combination or such a bit of the MAINTAIN register.

Although the invention has been described in connection with a particular embodiment thereof, additional applications, modifications, and embodiments which will be obvious to those skilled in the art are included within the spirit and scope of the invention.

What is claimed is:

1. A circuit for electrically interfacing a signal bus with a plurality of electric circuit devices, the circuit comprising
   first connections for receiving signals from said bus,
   second connections for presenting signals to said devices,
   means for coupling signals between said first and second connections, said coupling means comprising
   plural multistage registers, at least a first portion of said registers being provided for representing predetermined portions of said first connection signals,
   means for applying signals between selectable stages of selectable ones of said registers of said portion of registers and selectable ones of said second connections, and
   means, including a predetermined second portion of said plural registers, for controlling said applying means, and
   means, in said coupling means and responsive to predetermined portions of signals from said first connections, for provisioning said coupling means to determine how other predetermined portions of signals at said first connections will be presented at predetermined ones of said second connections.

2. The interface circuit in accordance with claim 1 in which there are provided
   means connecting a further one of said registers to be loaded and read from said first connections, without affecting said second connections, for diagnostic purposes.

3. The interface circuit in accordance with claim 2 in which
   said further register includes means for biasing a part of said stages thereof to a predetermined pattern of binary signal states.

4. The interface circuit in accordance with claim 1 in which there are provided, in addition,
   means for coupling an output of at least one stage of at least a first one of said plural registers to control the state of at least one different part of said interface circuit other than said one register.

5. The interface circuit in accordance with claim 4 in which said at least one stage output coupling means comprises
   means for controlling an operating condition of at least a stage of at least a second register of said plural registers.

6. The interface circuit in accordance with claim 5 in which said controlling means comprises
   means for enabling or inhibiting operation of said provisioning means as to stages of said second register according to a binary signal state of said stage of said first register.

7. The interface circuit in accordance with claim 1 in which said applying means includes
   means for coupling signals from at least one of said second connections to an input of an additional one of said plural registers for monitoring predetermined signal characteristics at said at least one second connection.

8. The interface circuit in accordance with claim 7 in which there are provided, in addition,
   means for coupling an output of a stage of one of said plural registers to control an operating condition of a stage of said additional register.

9. The interface circuit in accordance with claim 8 in which
   said input of said stage of said additional register is signal-edge responsive, and
   said one register output coupling means includes means for controlling said input of said stage of said additional register to be responsive to positive-going or negative-going input signal edges, depending upon the binary signal state of said stage of said one register.

10. The interface circuit in accordance with claim 1 in which said applying means comprises
    means for interconnecting only predetermined different stages of each register of at least one pair of said plural registers with said second conditions.

11. The interface circuit in accordance with claim 10 in which
    means are provided for biasing to a predetermined pattern of signal states predetermined different stages of each register of said at least one pair of registers.

12. The interface circuit in accordance with claim 10 in which said controlling means includes means for controlling said at least one pair of registers to receive input signals from said second connections, and there are provided
    means for timing the duration of a signal condition,
    means for coupling one of said predetermined stages of one register of said at least one pair to drive said timing means, and
    means for coupling an output of said timing means to set another stage, not a predetermined stage, of a register to such pair upon time-out of said timing means.

13. The interface circuit in accordance with claim 1 in which
    at least one stage of at least one register of said plural registers comprises a buffer amplifier in which output signal changes continuously track input signal states.

14. The interface circuit in accordance with claim 1 in which
    at least one stage of at least one of said plural registers is a bistable circuit in which an output signal assumes a state corresponding to an input signal only when an input of said bistable circuit is enabled to sample signals coupled thereto.

15. The interface circuit in accordance with claim 1 in which at least one of said registers is a bistable circuit including means for limiting response to input signals of only a single predetermined binary signal state.

16. The interface circuit in accordance with claim 1 in which said provisioning means comprises
    means for writing binary signal information from said first connections into a selectable one of said plural registers, and reading binary signal information from the last-mentioned one of said plural registers to said first connections.

17. The interface circuit in accordance with claim 16 in which said writing and reading means comprises
    means for receiving and transmitting a set of binary-coded signals including a data field, a read/write control signal field, and a register-designating address field,
    means, responsive to said address field, for enabling an addressed one of said registers to transfer data with said receiving and transmitting means, the transfer comprising the steps of
    loading data from said data field into said enabled one register if said read/write control signal indicates a writing operation and idling said enabled one register if said read/write control signal indicates a reading operation, and transferring contents of said enabled one register to said receiving and transmitting means, and means for actuating said receiving and transmitting means to transmit the transferred data.

* * * * *